United States Patent [19]

Duce

[11] Patent Number: 4,977,996
[45] Date of Patent: Dec. 18, 1990

[54] WAREHOUSING SYSTEMS

[75] Inventor: Edward Duce, Liversedge, England

[73] Assignee: Stockrail Limited, West Yorkshire, England

[21] Appl. No.: 333,491

[22] Filed: Apr. 4, 1989

[30] Foreign Application Priority Data

Apr. 5, 1988 [GB] United Kingdom ............... 8807877
Jul. 26, 1988 [GB] United Kingdom ............... 8817808

[51] Int. Cl.[5] ............................................. B65G 47/46
[52] U.S. Cl. ............................... 198/349.95; 198/360; 198/465.4; 198/467.1
[58] Field of Search ................ 198/349.95.1, 360, 367, 198/370, 465.4, 467.1, 485.1, 486.1, 680; 209/3.3, 937

[56] References Cited

U.S. PATENT DOCUMENTS

| | | | |
|---|---|---|---|
| 2,987,170 | 6/1961 | Hamilton | 198/370 |
| 3,002,635 | 10/1961 | Holland | 198/370 |
| 3,403,767 | 10/1968 | Gerisch | 198/360 |
| 3,627,153 | 12/1971 | Brummett | 198/367 |
| 3,707,925 | 1/1973 | Byrnes | 198/465.4 |
| 4,114,538 | 9/1978 | Nicodemus et al. | 198/680 |

FOREIGN PATENT DOCUMENTS 2076351 12/1981 United Kingdom ............. 198/465.4
2164909 4/1986 United Kingdom ........... 198/349.95
2188017 9/1987 United Kingdom .

Primary Examiner—Joseph E. Valenza
Attorney, Agent, or Firm—Klauber & Jackson

[57] ABSTRACT

The invention provides a warehousing system wherein garments on hangers are suspended from conveyors in equally spaced arrangement and are conveyed continuously from a delivery station to which they are supplied in a first order until they reach a dispatch station at which they arrive in another and desired order as dictated by the programming of a control computer. The pitching of the hangers is maintained by scroll conveyors and hangers are discharged from said conveyors by picking or gate devices which are operated by the computer based upon the counting revolutions the scroll conveyors. The system has storage carousel conveyors on which garments waiting to be picked are live stored in that they are continuously moved around the carousel conveyors. A particular sortation device comprises a drive scroll conveyor working in conjunction with a slide bar, a delivery scroll conveyor geared to the drive scroll conveyor and a transfer device to transfer hangers from the delivery scroll conveyor to the slide bar.

13 Claims, 6 Drawing Sheets

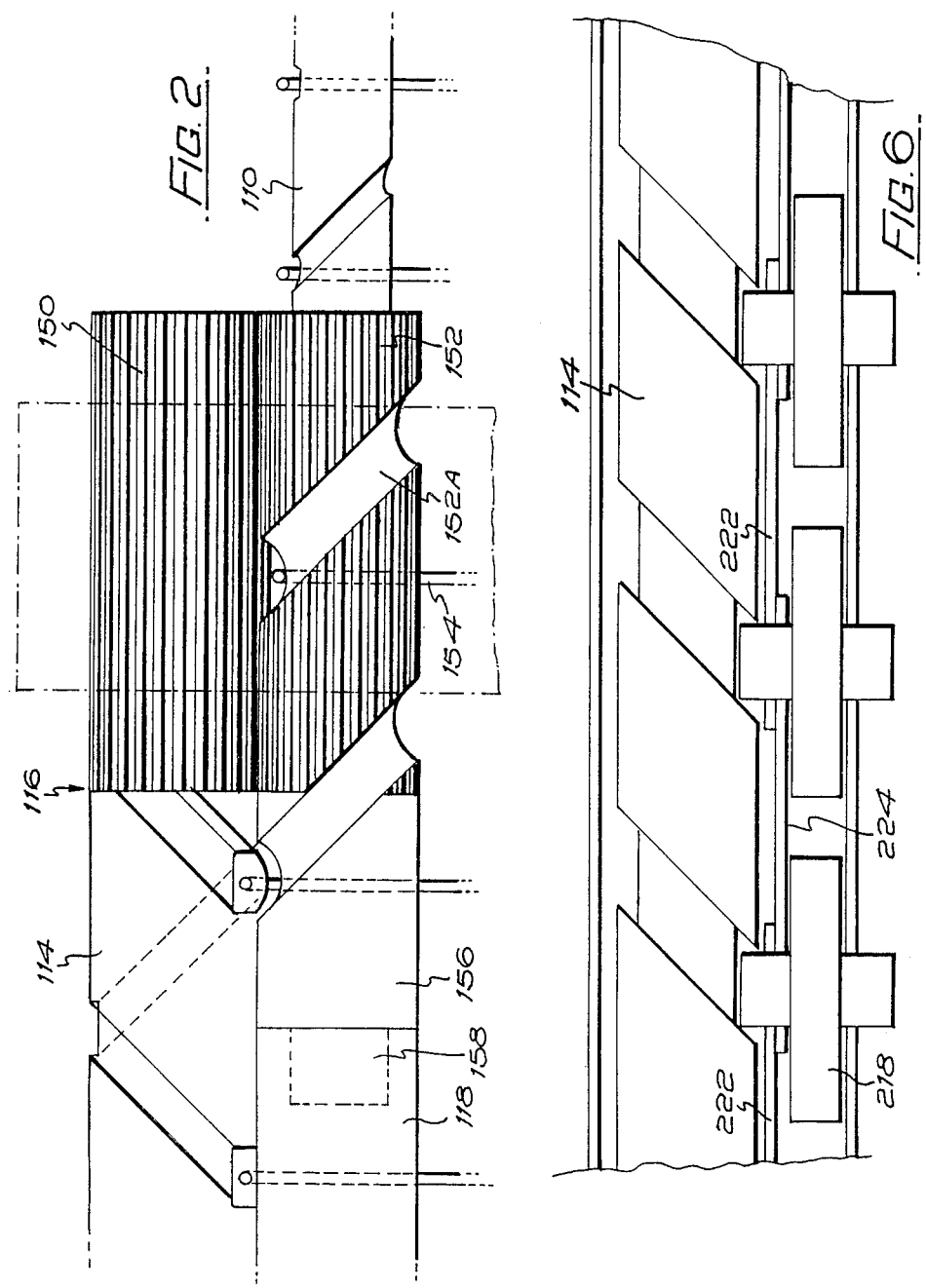

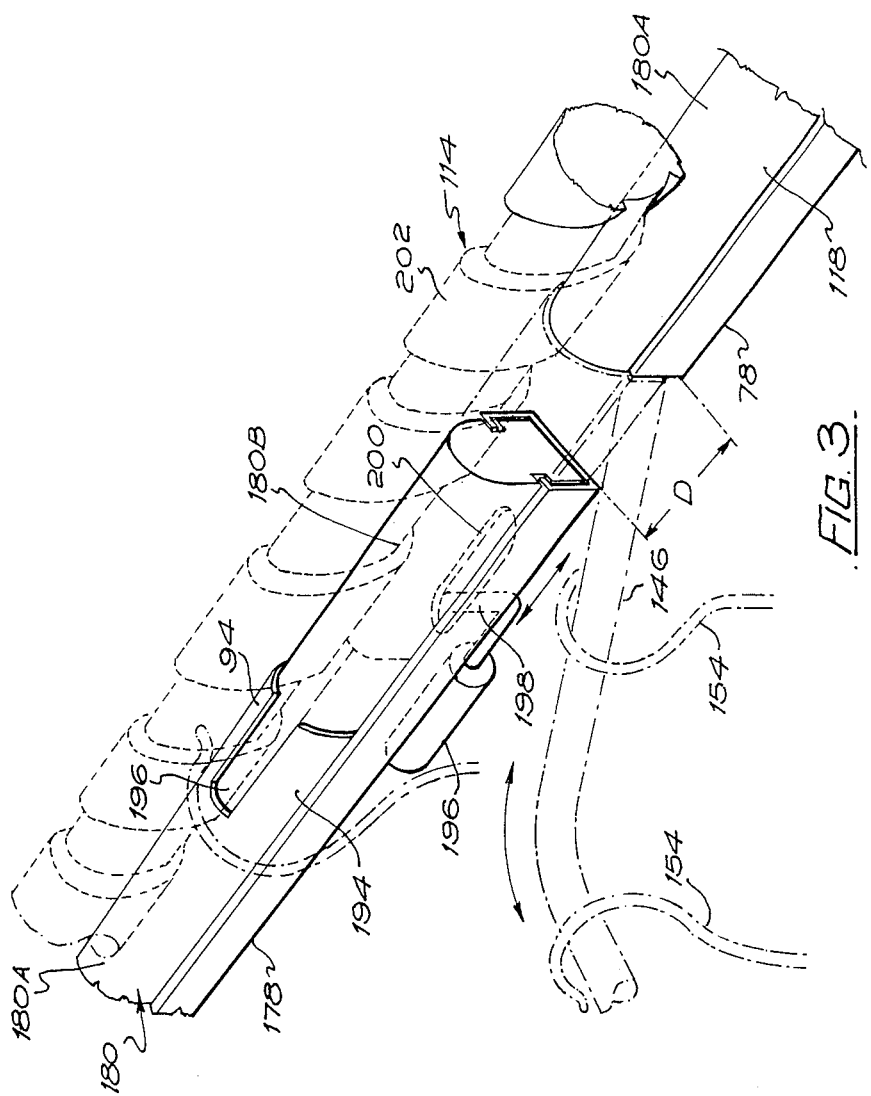

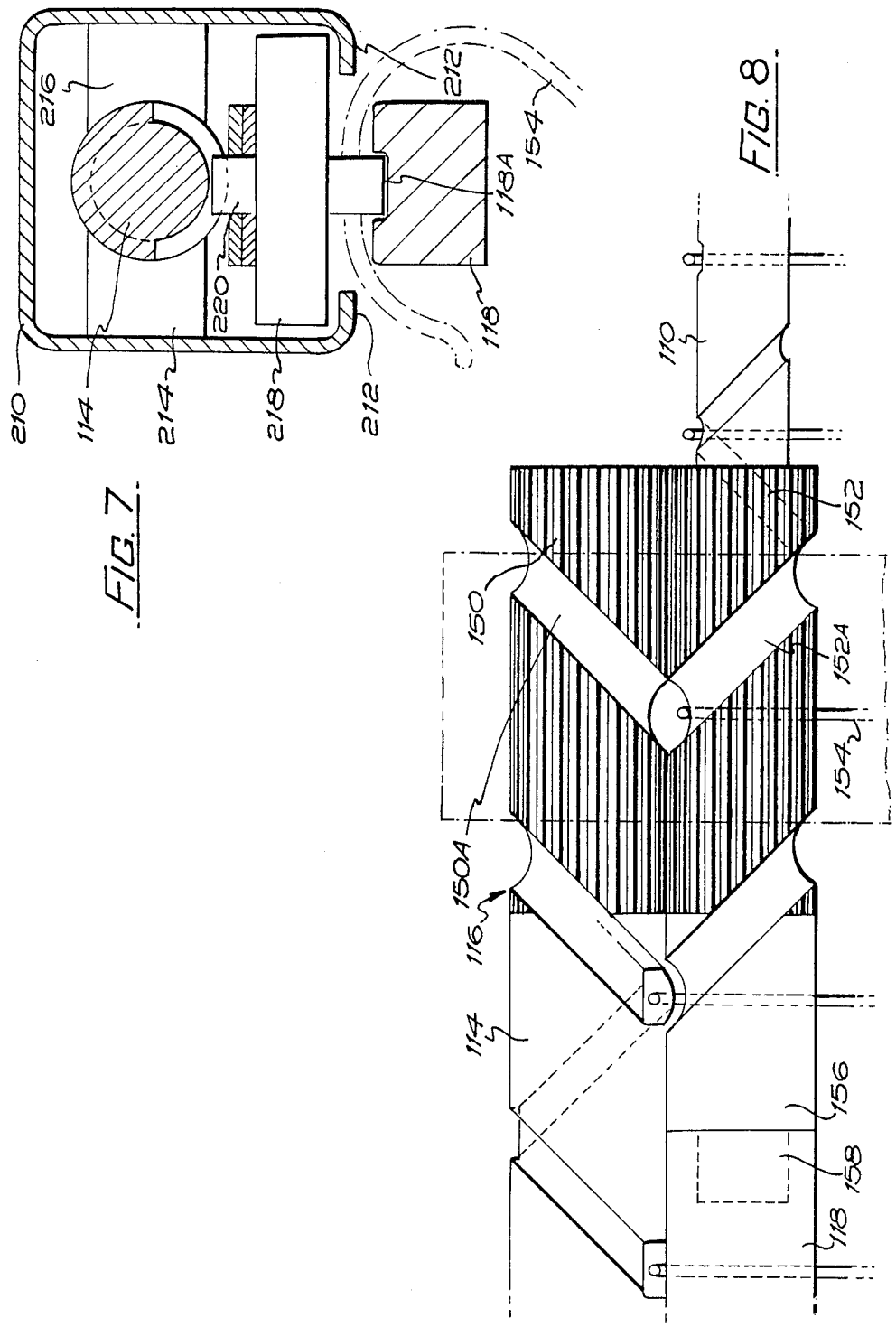

WAREHOUSING SYSTEMS

This invention relates to a warehousing system, particularly but not exclusively for the warehousing of garments which are suspended from individual hangers. The invention has application to the handling of other items suspended on hangers, but as the warehousing of garments is the prime area to which the invention relates, reference is made mainly hereinafter to the warehousing of garments. Such limited reference will facilitate description and understanding, but it is to be mentioned that at this time the invention is not to be considered as being limited thereto.

In a typical warehousing application involving garments, garments produced by a manufacturer are delivered in bulk, typically by container vehicles to a warehouse. The garments supplied will typically be of various types, sizes and colours but each size, type and colour typically will be delivered in fairly large numbers. The warehouse operator then has to "sort" the garments into individual orders comprising a certain number of each type as to style, size and colour. In the warehouse, the garments are individually suspended on hangers, and bundles of the garments are suspended on trolleys or suspension devices known as "sets" but generally speaking, the orders are made up manually by the picking of individual garments as to style, size and colour, and whilst the garments whilst supported in bundles on trolleys can be moved around the warehouse area in the desired fashion in order to achieve the best picking arrangement, and the trolleys are supported so as to be capable of rolling on overhead rails, a large amount of manual work is involved in the sorting of the garments into bundles.

When one considers that a typical warehouse may be of a size of 50,000 sq meters, capable of warehousing as many as 200,000 garments at any one time, an understanding of the handling problem and the amount of manual effort involved can be obtained.

With the present invention, the warehousing system is designed in order to facilitate the handling and sorting of individual garments, and in accordance with a first aspect of the invention there is provided, a warehousing system for the suspension and transportation of individual hangers for the support of goods or objects, comprising:

(a) a hanger delivery area;
(b) an in-feed conveyor for conveying hangers in spaced relationship from the delivery area;
(c) a plurality of in-feed conveyor distribution rails leading from the in-feed conveyor to respective storage carousel conveyors,
(d) a plurality of in-feed control gates in said in-feed conveyor, the operation of which causes hangers to be discharged from said in-feed conveyor to said discharge rails and to said carousel conveyors, each of said carousel conveyors being adapted to support said hangers in spaced relationship as the hangers are transported around an endless path defined by the carousel conveyor,
(e) picking means associated with each of said carousel conveyors whereby individual hangers may be picked from said carousel conveyors,
(f) picking control means for controlling the operation of said picking means for the selective picking of individual hangers from the carousel conveyors; and
(g) an out-feed conveyor onto which said individually picked hangers can be discharged.

By this arrangement, a more efficient and less manually intensive handling of the garments is achieved in that the individual garments are fed by the conveyors in spaced and individual arrangement, the conveyors being designed for maintaining the hangers in spaced relationship. By arranging for the hangers to be in such spaced relationship and held in such relationship by a suitable means, appropriate directing means can be designed and provided for directing individual garments into the carousel conveyors.

The conveyors may be of any suitable type, but scroll conveyors are particularly useful in that the hanger hook portions are adapted to engage in or be engaged by the flights of the scrolls; alternatively, the conveyors may be overhead dog conveyors having downwardly depending fingers or dogs which engage the hanger hooks and push same while they are supported on a support bar.

Each in-feed control gate may be a gate device at each of the distribution rails, said gate device being operated in accordance with pre-programmed information in order that particular garments will be directed to particular distribution rails.

Thus, the individual garments travel on the conveying means in spaced relationship, and they are moved therefrom onto the distribution rails in accordance with pre-programmed information.

It will be seen that by the arrangement, considerable warehousing improvements are realised in terms of reduction in man power required to operate the sorting arrangements.

The in-feed conveyor may suitably be for example as set out in United Kingdom Patent Application No. 8726709.

Each of said distribution rails may simply be a guide rod along which the garment hangers slide, and each carousel conveyor may be of a form for example as disclosed in copending British Patent Application No. 2188017. A carousel conveyor for suspended garments is basically an endless support on which the hangers hang, and drive means move the hangers along the endless support so that garments can be held in live storage until they are required to be picked in any particular order. It is preferred according to this invention that the carousel conveyors be scroll conveyors and be similar character in pitch to the scroll of the in-feed conveyor. That is to say, the carousel conveyor is preferably adapted to support the garments individually by their hangers at spaced intervals similar to the spacing of the hangers on the in-feed scroll, and as the carousel conveyor turns, the hangers are maintained in the spaced relationship so that handling and picking of same is facilitated and can be performed reliably and accurately. Each carousel conveyor is associated with a picking device whereby individual garments can be removed from the carousel and then placed on the out-feed conveyor which again is preferably a scroll conveyor to keep the individual garments suspended therefrom in predetermined spaced relationship. The out-feed conveyor may also be provided with picking points for the picking of individual garments and for the return of same to an output conveyor which again keeps the garments evenly spaced. The output conveyor may be of a similar type, and may be directed to the delivery station for the return of the garments now in order as to type, size and colour for direct return to the delivery vehicle.

It can be understood that a system designed as above can be made automatic by means of appropriate sensing and control devices whereby continuous monitoring of each garment by computing equipment can readily be effected. Computing equipment can also of course be used for the picking and distribution and sorting the individual garments.

This invention also has reference to the provision of a sortation device for use in a warehousing system in which hangers are conveyed in spaced, suspended arrangement and in accordance with another aspect of the present invention there is provided a warehousing system as aforesaid, wherein the in-feed conveyor comprises a first scroll on which the hangers can be suspended by hooking over the first scroll, a slide bar on which the hangers slide and a second scroll operatively coupled to the slide bar to drive the hangers along the slide bar, and a transfer means enabling the hangers to transfer from the first scroll to the slide bar, said slide bar having sections which are displaceable to form said control gates.

In another aspect as related to the sortation device, there is provided according to the invention a sortation device for a warehousing system in which hangers are conveyed by conveying means in suspended and spaced arrangement, said sortation device comprising a first conveyor means on which hangers are placed, a second conveyor means by which hangers are pushed along a slide bar from which they are suspended, and transfer means for transferring the hangers from the first conveyor to the second conveyor so that they travel on said second conveyor in suspended and equally spaced arrangement, displaceable portions in said slide rail at pre-selected locations thereon to form discharge gates from which the hangers can be discharged from the sortation device, and control means controlling the operation of said control gates for the selective sortation of the hangers based upon the number of pitches which each hanger has travelled from the transfer means.

The invention furthermore provides a sortation device for a warehousing system and wherein a drive scroll operates in conjunction with a computer control system, said drive scroll being operatively coupled to a slide bar for propelling hangers suspended from the bar therealong in spaced relationship, said slide rail having a number of spaced displaceable sections to form control gates to enable hangers to be selectively dropped from the slide bar, said computer control being arranged to drop the hangers from particular pre-programmed control gates dependent upon the number of rotations of the scroll spindle.

Embodiments of the various aspects of the present invention will now be described, by way of example, with reference to the accompanying diagrammatic drawings, wherein:

FIG. 2 is a side view of the gearing arrangement shown in FIG. 1;

FIG. 3 is a diagrammatic perspective view showing a section of the guide rail shown in FIG. 1;

FIG. 6 is a sectional elevation showing a further alternative drive arrangement;

FIG. 7 is a sectional view of the arrangement shown in FIG. 6; and

FIG. 8 is a view similar to FIG. 2 but showing an alternative arrangement.

Figure 1:
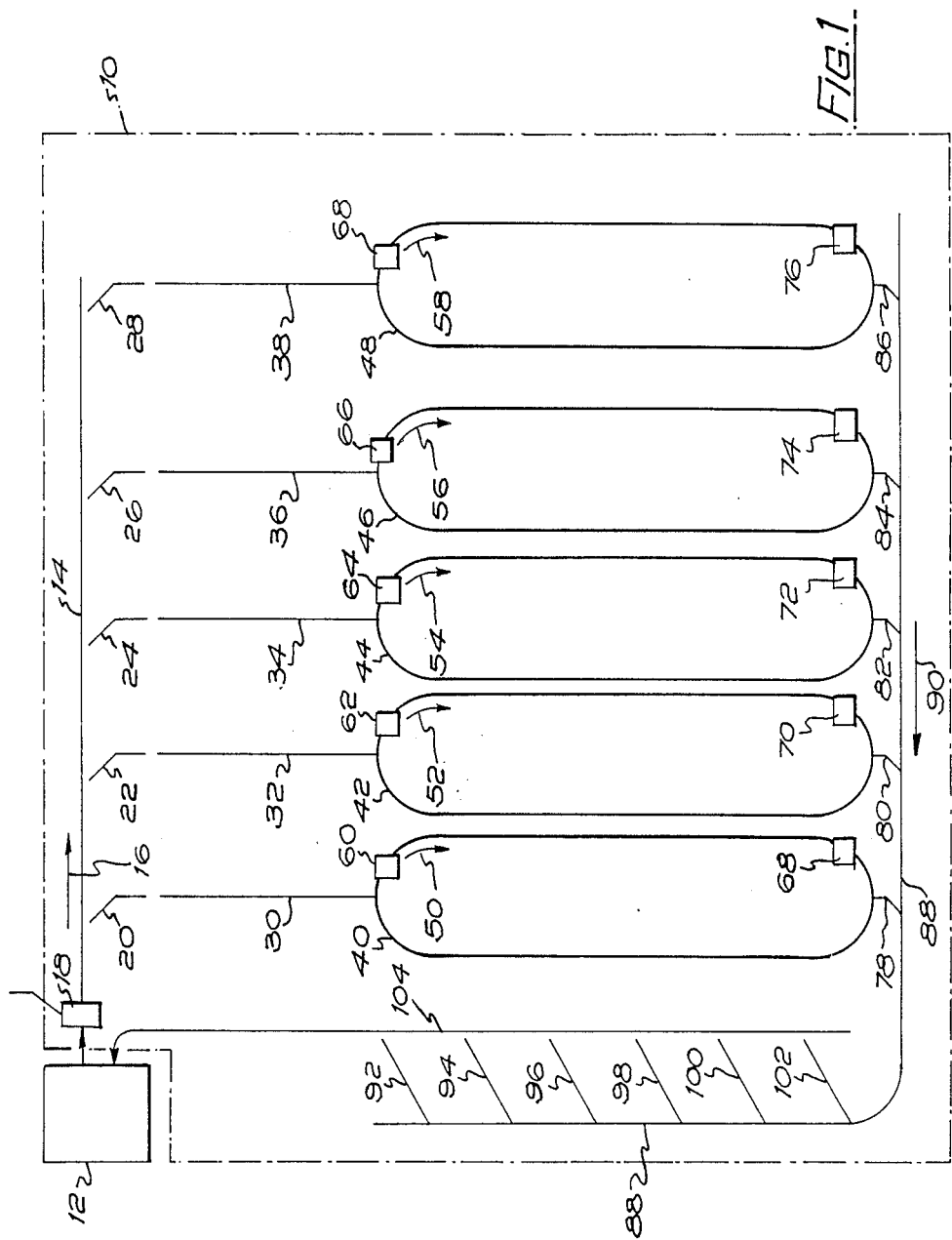
FIG. 1 shows one form of warehousing system according to the invention.

Referring to the drawings, FIG. 1 gives an indication of one particular warehouse layout which can be adopted, and referring to FIG. 1 of the drawings, the warehouse perimeter is indicated for example by reference numeral 10, and a delivery and loading station indicated by reference 12. Delivery vehicles with the newly manufactured garments suspended therein by individual hangers arrive at station 12. The garments are placed in a first order on a feed mechanism 14 which is a conveying mechanism which conveys the garments in the direction of arrow 16 individually and in predetermined spaced relationship. A suitable control device may be provided at 18 for sensing the delivered garments and for keeping a record of same, and also for controlling the operation of a number of picking points 20, 22, 24, 26 and 28 for picking individual garments depending upon style, colour or type as required from the conveying mechanism 14. Garments so picked are delivered along rails 30, 32, 34, 36 and 38 at which point they may be manually checked as to quality and they are eventually delivered to "live" carousels 40, 42, 44, 46, 48 around which they are continuously driven as indicated by arrows 50, 52, 54, 56 and 58, preferably whilst being maintained at a predetermined spaced relationship. Each carousel may have a first sensing mechanism 60, 62, 64, 66 and 68 which senses the arrival of particular individual garments from the rails 30 to 38, and a second sensing device 68, 70, 72, 74 and 76 which arranges for the picking of particular garments from the respective carousels and for discharing same by means of picking locations 78, 80, 82, 84, 86 from the carousels and delivering same to an order conveying mechanism 88 on which the garments are conveyed and are held in spaced condition, the direction of conveying being indicated by arrow 90.

Finally, from the conveying mechanism 88 the individual garments are picked and delivered along distribution lines 92, 94, 96, 98, 100 and 102 to a discharge conveying mechanism 104 which leads directly back to the delivery and discharge location 12, and in fact the garments can be discharged directly into the vehicles at this location in a second sorted order suitable for direct delivery to department stores and the like.

By the time the garments are delivered on output conveyor 104, they are arranged in predetermined bundles as to size, design and colour for particular orders to be delivered to particular retail stores, whilst the arrival of the garments from the vehicle from the manufacturer takes account of the fact that the garments may be arranged in random order.

A particular feature of the invention is that the garments are suspended individually and are held in spaced relationship by suitable conveying means whilst the handling, sorting and storage are taking place. As can be appreciated the control of the picking of the respective garments can be effected by computer control systems, and each garment may for example have a unique coding, such as a bar code flag attached thereto or attached to the hanger or any other suitable location. The programming arranges for the garments to be monitored at all times whilst present in the warehouse, and stock control is thereby much facilitated. The control system can be arranged to ensure that picking and ordering are performed with optimum efficiency.

As will be clear from the above, the invention conceives the provision of an automated warehouse system.

The movement of garments from their arrival when packed in bulk in a trailer to their subsequent despatch in a sorted load to a specific destination is controlled.

The overall system may depend on the "bar coding" of all garments. When garments arrive at the warehouse in bulk without bar coding then a first requirement may be to send them into an area for manual inspection, bagging and bar coding. Once this has been carried out then the garments may enter the warehouse environment.

When a delivery arrives at the warehouse, the incoming goods, if they are bar coded, may be checked automatically against the delivery note; provided that the supplier has already transmitted this information to the warehouse. If non-bar coded garments arrive then these garments must initially be bar coded as above.

The garments next pass into an area where they can be inspected either by sampling or if required 100% inspection. If no inspection is required then the garments may be passed immediately to the conveying system described.

Before the garments leave the manual operations they may be bagged.

As to the carousel units 40-48, a bank of 32 carousels may be arranged in groups of four, with eight carousels in each group to contain 38400 garments and garments enter each group at the end carousel and are transferred from one carousel to the next of each group as garments are selected for despatch. There is therefore only one input conveyor 14 for a storage unit holding 38400 garments. This facilitates the layout of the warehouse and saves space as the loading rail need not be long.

Garments are selected from the carousels in batches of 1000 or 1400 garments (these batches do not necessarily have to constitute a delivery to a specific location as they may be split later in the system) and passed to shuffle sortation units where they are sorted into the order required for despatch. Each shuffle sortation unit consists of four scrolls each having 24 or 32 output gates, the four scrolls are loaded with garments in succession and although mechanically independent they are controlled as one unit to execute the sort.

Whilst this sort is in progress further batches of garments may be selected from the carousels and passed on to any other shuffle sortation unit that may be free.

When each shuffle sort is completed the garments are then released by the stop and are then passed down one of the two transport systems to the loading bays where the respective gates are operated to divert the garments to the required bay. The gates are operated in such a manner that they are able to split a batch of garments coming from the shuffle sortation unit to complete a consignment in one of the bays, and send the balance of the garments to another bay.

If it is necessary to abort a load for any reason then the garments may be returned to stock automatically. Alternatively the garments may be passed to a temporary hold carousel for loading later.

When the garments pass into the loading bay they are handled by the same scroll that unloaded the vehicle and the garments are read by the same bar code reader that checked the incoming goods. The bar code reader is now used to generate the dispatch not for the outgoing goods.

The required sorts are passed to the system by a mainframe computer which gives its instructions, when required, to the warehouse system.

Figure 1A:
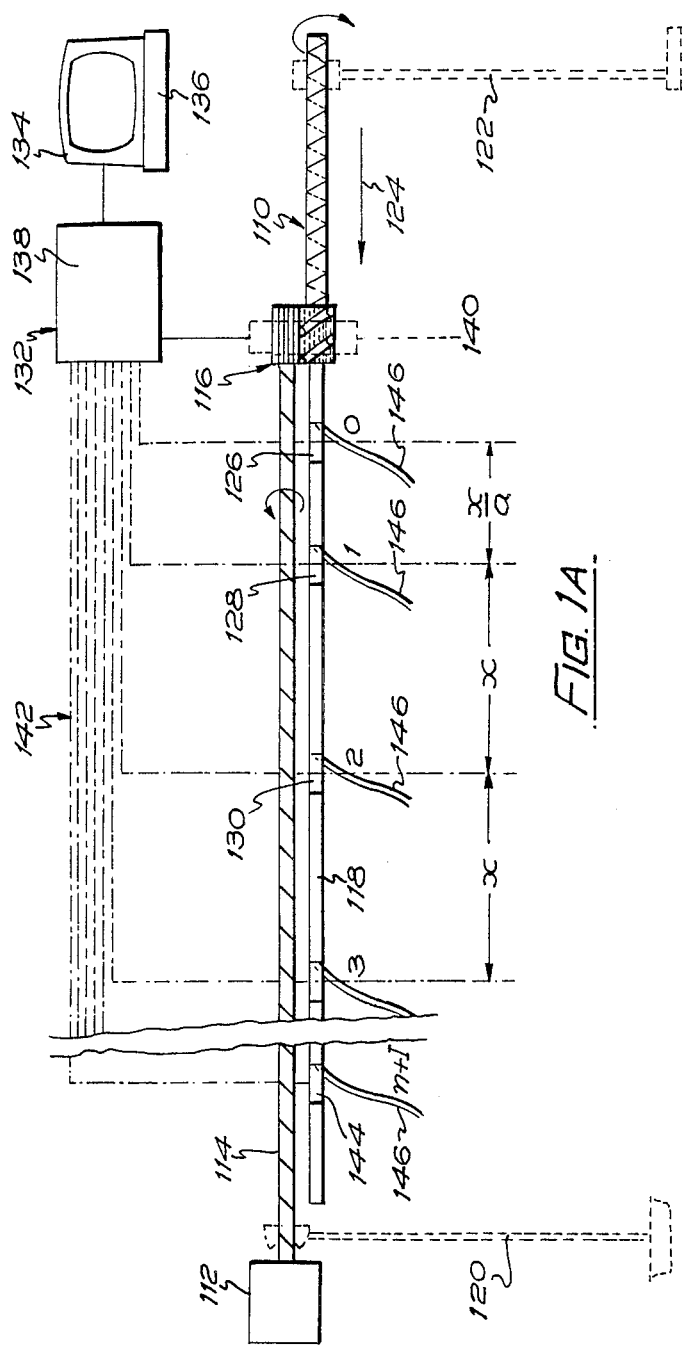
FIG. 1A is a side view of a handling system embodying the aspects of the invention.

FIGS. 1A to 8 show details of particular aspects of the systems described above and also different aspects of the present invention;

Referring to FIG. 1A, this shows diagrammatically a sortation device being a conveying arrangement for the hangers. Such devices may constitute the conveyor 14 of FIG. 1. The garments are placed on a first scroll conveyor 110 which is rotated by means of a motor 112 driving a drive and second scroll 114 which is geared to the first scroll 110 by means of gearing 116.

To the underside of the drive scroll 114 is a support bar 118 for hangers which are propelled initially by the scroll 110, and subsequently by the drive scroll 114.

The scrolls 110 and 114 are supported at a convenient height above the ground by means of a frame of which two frame members are indicated diagrammatically by reference numerals 120 and 122.

In use, the garments to be sorted are simply hung on the scroll 110 so that the hangers individually engage the scroll grooves or threads of the scroll 110. The rotation of the scroll 110 by the motor 112 as described propels the hangers individually along the scroll 110 as indicated by the arrow 124. The hangers pass through the gearing 116 in a manner as will be described hereinafter, and eventually are placed upon the guide bar 118. They are propelled along the guide bar 118 by means of the scroll 114, and the hangers are dropped from displaceable gates 126, 128, 130, respectively depending upon instructions from a computer control system indicated generally by reference 132. The control system comprises essentially a VDU 34 and programming keyboard 136, together with a control circuit 138. The control circuit 138 is coupled to a sensor 140 which senses the arrival of hangers and the passage of same through the gearing 116, and output connections 142 from the control unit 132 effect the opening and closing of the gates 126, 128, 130 and so on. In fact there may be a large number of the said gates, for example thirty two and in addition there is a first gate 126 which is the zero gate for discharging excess garments as will be explained hereinafter, and an N+1 gate 144 (N being the number of gates for which the system is designed) in order to collect hangers which are passed along the rail 118 beyond the gate from which they should have been discharged owing for example to a failure of that gate. Each gate is associated with a discharge or "slick" rail 146 for receiving and guiding the hangers which drop from the support rail 118.

The sortation device operates essentially as follows, a programmer will programme the control circuit 132 by the keyboard 136 in order to instruct the appropriate gates 126, 128, 130 to open in the correct sequence to give the discharge of the correct number of hangers and therefore garments from the gates to the slick rails 146 to make up respective orders. If for example each gate is to receive ten garments, then three hundred and twenty garments must be placed on the in-feed scroll 110 to complete the sortation. The garments can be placed on the scroll 110 one or more at a time, or if the scroll is long enough, at one time prior to the commencement of drive of the scrolls 110 and 114. The control box 138 therefore has to signal to the gates to open in order to ensure the discharge of ten garments into each gate. This is achieved in that the sensor 140 commences the sensing of the hangers passing through the gears 116. The first ten hangers have to be charged into the thirty second gate, the second ten hangers into the thirty first gate, and so on. The system ensures that the correct numbers of hangers are inserted into the correct gates by counting the revolutions of the scroll 114. The respective gates one to thirty two are spaced by the same pitching X and therefore the hangers can be allocated to the appropriate gates by the counting of the revolutions of the scroll 114. The counting is done by means of an encoder, which is operatively set up to sense based upon the pitch of the thread and the pitching of the gates. By this means it is ensured that the correct number of hangers will be inserted into each gate. Assume for example that to reach the thirty second gate the scroll 114 must make two hundred revolutions. When the sorting programme commences, the first hanger is detected as it passes the gears 116, the computer control ensures that the thirty second gate will not open and no other gate will open until two hundred revolutions of the scroll 114 have been effected. The thirty first gate will not open until the first ten hangers have passed that gate, and again this is related to a particular number of revolutions of the scroll 114. By this means the hangers will be properly discharged through the gates onto the slick rails 146 to make up garment orders.

FIG. 2 shows in enlarged detail the gearing 116. It will be seen that this comprises a cylindrical gear 150 which is integral with the drive scroll 114, and a cylindrical gear 152 which is integral with the input scroll 110. The gears 150 and 152 are in mesh to provide drive therebetween, but the gear 152 additionally is provided with a scroll groove 152A which forms a continuation of the scroll groove of the input scroll 110, so that hangers 154 can pass between the gears whilst they remain in mesh to be delivered from an end 156 of the scroll 110 onto the static support bar 118. To this end, the end 56 has a stub shaft 158 which engages in a recess in the slide bar 118 to provide a bearing.

Figure 4:
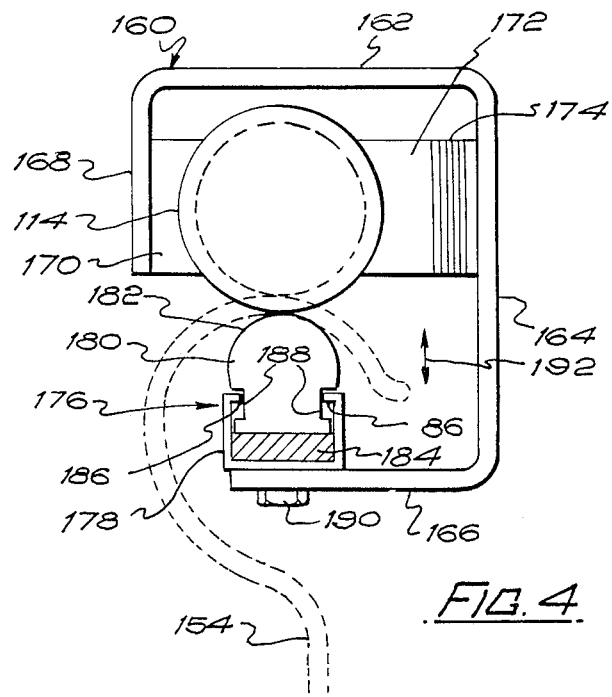
FIG. 4 is a sectional view of the arrangement shown in FIG. 3.

FIGS. 3 and 4 show one specific embodiment of support bar 118 and the drive scroll 114, FIG. 3 also illustrating the construction of each of the gates 126, 128, 130 enabling an opening to be created in the bar 118 at each of said gates so that a hanger can fall from such gate onto the slick rail 146.

Referring to FIGS. 3 and 4, the rail 118 comprises a profiled channel bar 160 having a top 162, a rear wall 164, a base 166 and a truncated front wall 168. Between the inside of the front wall 168 and the rear wall 164 are a plurality of spaced plastic bearing pads 170, 172, the pads 170 being mounted on the inside of the front wall 168, and the pads 172 being mounted, through suitable shims 174 on the inside of the rear wall 164. The opposing surfaces of the pads 170 and 172 are arcuate as shown so as to bear lightly against a scroll conveyor spindle 114, which is preferably of construction as described in our co-pending patent application Ser. No. 8,722,851 and serve to maintain the scroll spindle accurately in the position shown in FIG. 4 in relation to the channel bar 160.

On the upper surface of the lower wall 166 is mounted a support bar 176 which comprises elongated channel sections 178 and support rail sections 180 of plastics material which is self lubricating in nature. The sections 180 have a rounded upper surface 182 as shown, and the sections 180 rest upon a resilient spring loading sponge or rubber material 184 contained in the channel sections 178. Inwardly turned ledges 186 on the channel sections 178 engage in grooves 188 in the sections 180 as shown to prevent the sections 180 from moving laterally relative to the sections 178. The sections 178 are screwed to the lower wall 166 by means of screws 190. Because of the depth of the grooves 188, the sections 180 have the capability of limited up and down movement as indicated by arrow 192 so that the upper curved surface 182 can be positioned accurately, and in particular tangentially to the scroll spindle 114 as shown in FIG. 4.

As shown in FIG. 3, the ends of adjacent sections 178 are spaced by the distance D, and the lower wall 166 is cut away in the region of these spacings, this being to allow hangers 154 to drop from the support bar 118 through the spaces D as explained herein.

Each section 180 of plastics support bar is of the same length as each of the rail sections 178, but is made up of two parts 180A and 180B which are telescopic one relative to the other in that one end of part 180A is bifurcated as shown at 194 in FIG. 3, and the other part 180B has a tongue 196 which locates between the bifurcated portions 194 when the section 180 is contracted or at minimum length. The section 180B however is slidable in the direction of its length relative to section 180A, for example by means of the actuation of an air cylinder or similar device 196 which is connected to the section 180B by means of a connecting bar 198, which extends through a slot 200 in the underside of the associated section 178. The devices 196 may be contained in the bar 118 if required. The part 180B is slidable in the manner indicated by the arrow in FIG. 3. When the cylinder 196 is extended from the position shown in FIG. 3, the part 180B moves to the dotted line position so as to become a smooth continuation of the part 180A of the adjacent section 180 and in this extended position, the tongue 196 does not move completely outside the bifurcated portion 194 so that the two sections 180 shown in FIG. 3 form a smooth continuation for the support of hangers 154. Instead of section 180B being adapted to slide as shown it may alternatively be adapted to be pivoted to an open position allowing the hangers to drop from the rail 118. Also, instead of using a scroll to drive the hangers along bar 118, a drive chain and dogs may be used.

The operation of the conveyor assembly will be understood from the foregoing description, but the apparatus described with reference to FIGS. 3 and 4 basically operates as follows.

The scroll spindle is driven by the motor 112 and a slipping clutch (not shown) at the appropriate speed for the feeding of the hangers along the support bar 118 at the required feed rate. The hangers 154 are supported by the bar 118 as described, and the hangers 154 will normally be regularly spaced, but need not be as the control system counts the number of revolutions of the drive scroll 114 after each hanger passes gear 116 to ensure that the hanger is discharged onto the correct slick rail. The hook portions supported by the rail 118 are located between adjacent threads of the drive scroll spindle 114. The scroll spindle 114 is positioned as shown in FIG. 4 so that the threads overlap the hook portions and will drivingly engage same when the spindle is rotated. All of the movable portions 180B of the bar 118 are positioned corresponding to the extended position of the associated ram 196, so that the rail 118 defines a continuous support surface along which the hangers can be propelled. It is noticed that the scroll spindle 114 performs only the function of driving the hangers along a support bar and does not take the weight of the hangers as in conventional arrangements.

Figure 5:
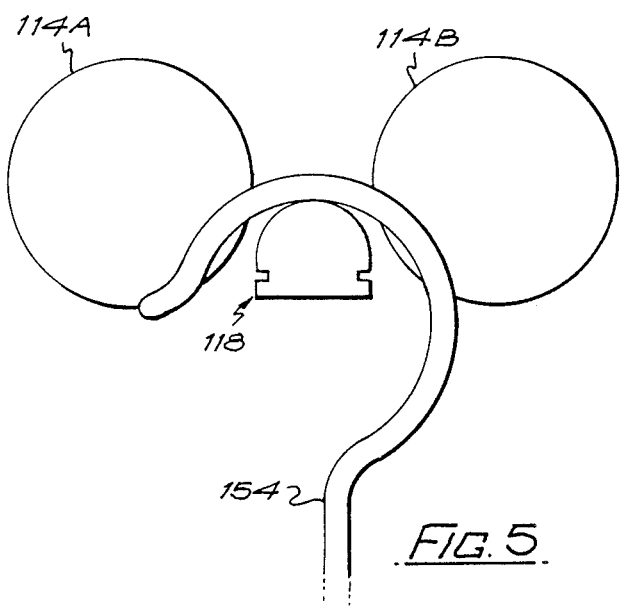
FIG. 5 is a sectional view similar to FIG. 4 but showing an alternative drive arrangement.

In the arrangement shown in FIG. 5, instead of using a single scroll spindle 114, two scroll spindles 114A and 114B are used and these are disposed on opposite sides of the support rail 118 as shown so as to be out of contact with the support rail, but in substantial overlapping contact with the hook of the hanger 154. By this arrangement any friction loading between the rail 118 and the scroll conveyors 114A and 114B is eliminated.

Referring now to FIGS. 6 and 7, an alternative drive arrangement between the support rail 118 and the drive scroll 114 is shown. The drive scroll 114 is housed in a profiled channel bar 210 of generally inverted U-section with the limbs having inwardly turned support flanges 212. Bearing pads 214 and 216 similar to bearing pads 170 and 172 shown in FIG. 4 serve to support the feed scroll 114. Instead of the scroll directly engaging the hangers 154, there is an intermediate chain assembly located between the scroll 114 and the support rail 118. The chain assembly comprises plastics material discs 218 having spindles 220. Each spindle 220 as shown in FIG. 6 engages the thread of the scroll 114, and steel chain links 222, 224 are pivoted on the disc spindles 220 as shown thereby forming a chain including the said discs 218. At the lower ends, the spindles 220 engage the bar 118, preferably in a recess 118A in the top of the bar 118 so that it is the lower end of the spindle 118 which in fact engages and drives the hangers 154, as will be understood from FIGS. 6 and 7.

The advantage of this arrangement which in itself forms an aspect of the invention is that the drive is contained within an inverted U-profiled bar, and a straight length of scroll 114 can be used to drive the chain made up of the links 222, 224 and the discs 218 around an endless curved path which can deviate from the axis of the scroll 114. The profiled bar 210 furthermore keeps the discs 218 in the required register position between the scroll 114 and the support rail 118.

This form of drive connection in itself constitutes an invention and the applicant reserves the right to seek protection therefor.

The various aspects of the present invention provides an extremely effective handling system.

On the one hand, the control of the hanger discharge is effected by detecting the presence of a hanger and then measuring the number of rotations of the feed scroll, making the sortation effective and efficient. On the other hand, the combined use of a first scroll as the feeder and a second drive scroll with a transfer device provides an arrangement for handling assistance which is extremely useful. Thirdly, the drive arrangement providing a chain assembly between the scroll and the support rail enable driving around an endless path by means of a relatively short length of drive scroll.

Various additional features may be embodied in the system described in order to enhance the operation of same. For example a proximity switch may be used for detecting when two hangers are engaged in the same scroll thread. Such a proximity switch may be an inductive detector which detects the mass or volume of metal in the field thereof so that when two hangers are present in a single thread, the inductive change will signal this particular undesired condition, and the two hangers can be ejected from the system for example by the opening of gate zero.

In another modification, the drive scroll can be arranged to turn the hanger angularly relative to the guide rail so as to present for example a coding on the hanger at a more suitable angle to be read by a sensing device such as an optical reader. The coding may for example be a bar code. The system may be arranged so that the drive scroll turns the hanger after a predetermined number of revolutions, say five so that the code will be accurately positioned in relation to the reader for the effective reading of same. When the code of a particular hanger and therefore the article has been read, it can be stored in the system until that article has discharged so that monitoring of the movement of that article through the system can be effected. A record can be kept of for example the position of the hanger in the system and when it is ejected from the system.

Referring to FIG. 8, which shows a construction similar to that shown in FIG. 2, but with a modification, the gear 150 is also provided with an opposite handed groove 150A which mates with the groove 152 as shown, and the joint grooves form a pocket for receiving the hanger 154. The hanger will in fact be of a size so that it is driven equally by the two spirals 150A and 152A as the gears rotate.

The provision of interlocking gears with spirals for the driving of articles such as coat hangers in itself constitutes a patentable feature which it is sought be protected or protectible independently of the other aspects of the invention as referred to herein.

It will be appreciated that the general principles of the handling system according to the invention can be employed generally regardless of the nature of the suspension devices or the articles held by such suspension devices, but as the invention can be best explained in our view by making specific reference to the suspension of articles of clothing by means of hangers, the reference made hereinbefore only to these items serves to indicate a best use of the invention, but the applicant recognises that the invention may have wider application.

In large scale warehouses housing articles of clothing, sortation of such articles into orders for specific regions or specific retail outlets such as large department stores is required to be effected. Presently, this is effected manually, and is time consuming and slow. For example manual workers may be required to take a batch of one hundred garments of a particular type and to sort it into bunches for example of ten each to be sent to ten different stores throughout the country. These numbers are given as examples only, and in fact could be much larger. Additionally, sortation of different types of garments is required in order to build up complete orders for the stores.

The present invention provides a means for the facilitating of this type of sortation, but it does have wider application. The invention in at least one aspect provides a sortation system of mechanical design which is computer controlled.

I claim:

1. A warehousing system for the suspension and transportation of individual hangers for the support of goods or objects, comprising:
   (a) a hanger delivery area;
   (b) an in-feed conveyor for conveying hangers in spaced relationship from the delivery area;
   (c) a plurality of in-feed conveyor distribution rails leading from the in-feed conveyor to delivery locations;

(d) a plurality of in-feed control gates in said in-feed conveyor, the operation of which causes hangers to be discharged from said in-feed conveyor to said delivery locations; and (e) said in-feed conveyor comprising a first scroll on which the hangers can be suspended by hooking over the first scroll, a slide bar on which the hangers slide, a second scroll operatively coupled to the slide bar to drive the hangers along the slide bar, and a transfer means enabling the hangers to transfer from the first scroll to the slide bar, said slide bar having sections which are displaceable to form said control gates.

2. A warehousing system according to claim 1, further comprising an out-feed conveyor onto which individually picked hangers can be discharged, said out-feed conveyor including a conveyor which conveys the hangers in spaced arrangement.

3. A warehousing system according to claim 2, wherein the in-feed and out-feed conveyors are each adapted to maintain adjacent hangers supported thereby, spaced by a fixed pitch.

4. A warehousing system according to claim 3, wherein said control gates are operated for the discharging or picking of any particular hangers in the system by keeping track of each hanger in the system by counting the number of pitches each hanger is from datum positions of at least the in-feed conveyor.

5. A warehousing system according to claim 4, wherein the control gates are under the control of a computer program which enables the operator to distribute all the hangers placed on the in-feed conveyor to be sorted into groups and the respective groups discharged into the respective distribution rails by the automatic operation of said gates.

6. A warehousing system according to claim 2 wherein said in-feed conveyor, and out-feed conveyor each comprises a scroll conveyor and the scroll pitch is common to both of said conveyors.

7. A warehousing system according to claim 2, wherein the out-feed conveyor has a plurality of out-feed conveyor distribution rails leading from said out-feed conveyor to an output conveyor which leads to said delivery area which also forms a dispatch area.

8. A warehousing system according to claim 1, wherein said first and second scrolls have the same pitch.

9. A warehousing system according to claim 1, wherein the transfer means comprises gearing in the form of gears respectively on the first and second scrolls, said gears being in mesh, and the gear on the first scroll being intersected by a first scroll thread to enable hangers to be carried through the gearing to the slide bar.

10. A sortation device for a warehousing system in which hangers are conveyed in suspended fashion and in spaced arrangement by warehousing conveyors, said sortation device comprising a first scroll on which the hangers can be suspended by hooking over the first scroll, a slide bar on which the hangers slide and a second scroll operatively coupled to the slide bar to drive the hangers along the slide bar, and a transfer means enabling the hangers to transfer from the first scroll to the slide bar, said slide bar having sections which are displaceable to form said control gates.

11. A sortation device according to claim 10, wherein said first and second scrolls have the same pitch.

12. A warehousing system according to claim 9, wherein the gear on the second scroll is intersected by a second scroll thread and the scroll threads on the first and second gears cooperate to form pockets in which hangers can be carried through the gearing to the slide bar.

13. A warehousing system according to claim 1, wherein the control gates comprise displaceable sections in said slide bar.

* * * * *